United States Patent
Bringer et al.

(10) Patent No.: US 9,412,004 B2
(45) Date of Patent: Aug. 9, 2016

(54) BIOMETRIC CODING

(75) Inventors: Julien Bringer, Paris (FR); Vincent Despiegel, Paris (FR)

(73) Assignee: MORPHO, Paris (FR)

( * ) Notice: Subject to any disclaimer, the term of this patent is extended or adjusted under 35 U.S.C. 154(b) by 406 days.

(21) Appl. No.: 13/518,490

(22) PCT Filed: Dec. 23, 2010

(86) PCT No.: PCT/FR2010/052905
§ 371 (c)(1),
(2), (4) Date: Jun. 22, 2012

(87) PCT Pub. No.: WO2011/077061
PCT Pub. Date: Jun. 30, 2011

(65) Prior Publication Data
US 2012/0284284 A1    Nov. 8, 2012

(30) Foreign Application Priority Data

Dec. 23, 2009    (FR) ...................................... 09 59468

(51) Int. Cl.
*G06K 9/00*    (2006.01)
*G06F 21/32*    (2013.01)

(52) U.S. Cl.
CPC ............ *G06K 9/00087* (2013.01); *G06F 21/32* (2013.01)

(58) Field of Classification Search
CPC ...................................................... G06F 21/32
USPC .............................. 707/758; 713/186; 382/115
See application file for complete search history.

(56) References Cited

U.S. PATENT DOCUMENTS

| | | | | |
|---|---|---|---|---|
| 5,291,560 A | * | 3/1994 | Daugman | A61B 3/1216 351/206 |
| 5,845,005 A | * | 12/1998 | Setlak et al. | 382/124 |
| 6,047,282 A | * | 4/2000 | Wilson | G06F 17/30247 |
| 6,195,447 B1 | * | 2/2001 | Ross | 382/125 |
| 6,920,231 B1 | * | 7/2005 | Griffin | G06K 9/00885 340/5.83 |
| 7,512,254 B2 | * | 3/2009 | Vollkommer et al. | 382/115 |
| 8,375,218 B2 | * | 2/2013 | Yedidia | G06K 9/00073 709/248 |
| 2003/0061233 A1 | * | 3/2003 | Manasse et al. | 707/104.1 |
| 2004/0148509 A1 | * | 7/2004 | Wu | G06F 21/32 713/186 |
| 2006/0104484 A1 | * | 5/2006 | Bolle et al. | 382/115 |
| 2006/0126904 A1 | * | 6/2006 | Lee | G06K 9/00885 382/115 |
| 2007/0174633 A1 | * | 7/2007 | Draper et al. | 713/186 |
| 2009/0287930 A1 | * | 11/2009 | Nagaraja | 713/171 |

OTHER PUBLICATIONS

Marino et al., Personal authentication using digital retinal images, Pattern Anal Applic (2006) 9: 21-33.*
International Search Report and Written Opinion for PCT/FR2010/052905 mailed Mar. 25, 2011 (10 pages).

(Continued)

*Primary Examiner* — Cheyne D Ly
(74) *Attorney, Agent, or Firm* — Gardere Wynne Sewell LLP; Andre M. Szuwalski (57) ABSTRACT

A database stores a number N of biometric data representatives which correspond to a set of characteristics of said biometric data. Acquired biometric data is obtained. Then, transformed biometric data is obtained by transforming the acquired biometric data according to said set of characteristics. Next, N deviation values are obtained by applying a comparison between the transformed biometric data and the N representatives in the database. Finally, a vector representing the acquired biometric data is obtained, the representation vector having a number of components less than or equal to N, said components being determined in relation to said N deviation values.

18 Claims, 3 Drawing Sheets

(56) References Cited

OTHER PUBLICATIONS

Aglika Gyaourova et al: "A Novel Coding Scheme for Indexing Fingerprint Patterns," Dec. 4, 2008, Structural, Syntactic, and Statistical Pattern Recognition, Springer Berlin Heidelberg, pp. 755-764.
Gyaourova A et al: "A Coding Scheme for Indexing Multimodal Biometric Databases," Computer Vision and Pattern Recognition Workshops, Jun. 20, 2009, pp. 93-98.
Liu et al: "Efficient Fingerprint Search Based on Database Clustering," Pattern Recognition, Elsevier, Mar. 18, 2007, pp. 1793-1803.
Davide Maltoni, et al: "Handbook of Fingerprint Recognition," Sections 3.1, 3.2, 5.4, Springer, Jun. 1, 2009.
HW, Kuhn: "The Hungarian Method for the Assignment Problem," Naval Research Logistics Quarterly, vol. 2, No. 1-2 (1955), pp. 83-97.

* cited by examiner

BIOMETRIC CODING

PRIORITY CLAIM

This application is a 371 filing from PCT/FR2010/052905 filed Dec. 23, 2010, which claims priority from French Application for Patent No. 0959468 filed Dec. 23, 2009, the disclosures of which are hereby incorporated by reference.

TECHNICAL FIELD

The invention relates to biometric data, particularly their representation for later use in applications.

BACKGROUND

There are many applications which rely on a comparison of biometric data. Examples of such applications include biometric authentication or identification of a person. In this type of application, biometric data are captured for different persons during an enrollment phase and stored in a database. Next, in a later step, in order to identify or authenticate someone, biometric data is captured for this person. On the basis of a comparison between the biometric data stored in the database and the acquired biometric data, the decision can then be made as to whether the person is authenticated or identified. Below, an acquired biometric data item is also referred to as "an acquired biometric data item".

Thus the biometric authentication or identification is based on a comparator which compares biometric data items. After the comparison, this comparator provides an indication of the similarity between two biometric data items, generally referred to as the "score". This indication allows determining a level of resemblance between the two compared biometric data items, and thus allows deciding whether these two biometric data items come from the same individual.

In certain applications based on a biometric data comparator, it is important to be able to compare biometric data easily, using simple operations. However, it is not always easy to obtain such simplicity of operation when manipulating biometric data.

It is known to create biometric data indexing in a biometric database. The biometric data are assembled into groups of prints having the same index or a similar index (if considering the Hamming distance for example). When wanting to check whether a captured print corresponds to a legitimate print in the database, the index for the captured print can be calculated, and the captured print compared only with the prints in the database having an identical or similar index, which reduces the number of comparisons and therefore accelerates the search (the known comparison algorithms are generally slow). The index alone does not allow avoiding later comparison steps with all the biometric data for the group concerned.

SUMMARY

The invention aims to improve this situation.

A first aspect of the invention proposes a method for coding (in the form of a vector representation) a biometric data item, wherein a database stores a number N of representatives of biometric data items;
a representative of a biometric data item corresponding to a set of characteristics of said biometric data item;
said representation method comprising the following steps:
/a/ obtaining an acquired biometric data item;
/b/ obtaining a transformed biometric data item by transforming said biometric data item according to said set of characteristics;
/c/ obtaining N deviation values by applying a comparison between the transformed biometric data item and the N representatives in the database; and
/d/ obtaining a representative vector for the acquired biometric data item, said representative vector having a number of components that is less than or equal to N, said components being determined relative to said N deviation values.

Here, an acquired biometric data item is represented in vector form to allow easily manipulating this biometric data item in later applications, and in particular to allow comparing the vector representing this biometric data item to a vector representing another biometric data item in order to determine whether the two vectors correspond to the same person.

For this purpose, a database is provided comprising representatives of different biometric data. Here a database is used such that it can illustrate a relatively diversified biometric data space.

The term "representative of a biometric data item" is understood to mean a set of characteristics of this biometric data item. In this context, the biometric data considered here are manipulated in the form of a set of characteristics. These conditions advantageously allow comparing biometric data in a form appropriate for applying a method according to an embodiment of the invention. The phrase "transforming a biometric data item according to a set of characteristics" is understood to mean that the transformed biometric data item issuing from this transformation is described by a set of characteristics. Two biometric data items described using the same set of characteristics can therefore be easily compared.

This database can be considered a reference database for a biometric dataspace. Using this reference database, it is possible to position, or locate, an acquired biometric data item in this biometric dataspace. By evaluating the deviation in this space between each representative in the database and an acquired biometric data item, a set of values is obtained which allow representing the biometric data concerned in vector form.

By taking the representatives in the database in a given order, vectors representing biometric data can be obtained which are comparable to each other, as the components of the various vectors correspond to each other in that they indicate a comparison to the same respective representatives in the database.

Here we propose first capturing a biometric data item. Then, in order to obtain a representation of this acquired biometric data item that is easy to manipulate, it is compared to each of the representatives in the database. This comparison can be made by applying a comparison algorithm of any type. No limitation is placed on the type of algorithm. After such a comparison is made between the acquired biometric data item and a representative in the database, an indication of the proximity between these two compared elements is obtained, or a deviation value between biometric data. This deviation value is referred to as the "score". Based on the deviation values obtained, it is possible to determine the proximity of each representative to the captured biometric data in the biometric dataspace concerned.

Then, on the basis of the deviation values obtained for the captured biometric data, a number of components for the representative vector that is less than or equal to N can be determined. In one embodiment, it may be advantageous to have a constant number of components in the representative vector for all biometric data to be represented. It can be arranged so that either a component is determined for each deviation value, thus obtaining a representative vector of N components, or only the most relevant deviation values are selected using a specific criterion, in order to determine a representative vector component for each deviation value selected. In the latter case, it can be arranged so that step /d/ has the following steps:

/i/ selecting, from among the N deviation values, the values that are relevant according to a criterion; and /ii/ determining the components relative to the respective deviation values selected.

In this context, the term "criterion" is understood to mean at least one threshold value for example to which the deviation values are compared to determine if the deviation value is relevant or not.

This representative vector allows positioning to a certain extent the acquired biometric data item in the biometric dataspace consisting of representatives stored in the database.

By these arrangements, a representation of captured biometric data can be obtained that is both relevant and easy to use.

It should be noted that any biometric data item can advantageously be represented here as a vector of a constant length equal to the number of representatives stored in the database. Such a fixed length representation facilitates manipulation of the biometric data by applications.

This representation of biometric data is particularly suitable for use in a context of a comparator which requires simple comparison operations, such as a crypto-biometric comparator for example, which is a comparator that combines the field of biometrics and cryptographic techniques.

As an example, the set of biometric data characteristics used to compare biometric data in this context may correspond to a local biometric data definition. In this case, only a portion of the biometric data is taken into consideration. The set of characteristics describes this portion locally.

In the context of the invention, the term "biometric data" can refer to any type of biometric data in the most general sense, such as a print, finger, palm, vein, etc.

When the biometric data corresponds to a fingerprint, the local definition may then be obtained by:

determining a main minutia; and determining local information relating to characteristics neighboring the main minutia.

In one embodiment of the invention, the local information indicates at least one element from among the following: a position of a neighboring minutia, a ridge count, a minutia type, and a local curvature.

A local definition, or local descriptor, of a fingerprint can therefore correspond to a neighborhood, meaning a set of minutiae, centered around a main minutia and containing the set of minutiae present within a given radius. A given fingerprint can have as many associated neighborhoods as it has minutiae. In other words, it is possible to determine several local descriptors for a biometric data item, each local descriptor relating to a main minutia among the various minutiae of the fingerprint concerned. It is, of course, possible to take a different number of local descriptors of representatives stored in the database than the number of local descriptors taken into consideration for a fingerprint to be represented.

In order to establish a correspondence between neighborhoods, a dynamic pairing of the various local information items forming these neighborhoods can be used, such as the one described in the document "The Hungarian Method for the Assignment Problem," H W. Kuhn, Naval Research Logistics Quarterly, Vol. 2, No. 1-2. (1955), pp. 83-97 (the disclosure of which is incorporated by reference). This allows determining a score as a distance between two neighborhoods. In one embodiment, the distance of a given fingerprint from an element in the database can be determined by determining the minimum distance among the distances obtained between this element and all the neighborhoods extracted in this given fingerprint. Such an element may correspond to a single neighborhood. In this case, a fingerprint is characterized according to local characteristics.

By proceeding in this manner, it is possible to manage the problems of elastic deformation inherent in fingerprints, as well as in fingers, hands, or more generally in all contact-based biometric data.

This main minutia may advantageously be used to align the descriptors with each other and thus simplify their comparison with each other in order to accelerate processing.

The set of characteristics may also correspond to an image illustrating the biometric data. Such may be the case when the biometric data is a fingerprint and it is converted to an image. Such an image may be a RFM image (for Ridge Flow Matrix), or referred to as Orientation Field or Orientation Image, as described for example in the Handbook of Fingerprint Recognition, Maltoni, D., Maio, D., Jain, A. K., Prabhakar, S., Springer-Verlag, 2009 (the disclosure of which is incorporated by reference).

Depending on what manipulations of the representative vectors are desired, it may be of interest to have the components of a representative vector correspond directly to the respective deviation values obtained for the biometric data item relative to each representative of the database concerned. In another embodiment, it may be advantageous to express the representative vector in binary form.

In this case, it can be arranged so that the representative vector for the biometric data is a binary vector in which the components are obtained by comparison to at least one threshold value.

In one embodiment of the invention, the binary vector is obtained by the following steps:

determining a statistical noise value relative to each representative;

obtaining a weight associated with each representative as a function of the statistical value relative to it;

determining the binary components of the representative vector by comparing the deviation values obtained for the respective representatives to the threshold value, taking the associated weight into consideration.

By proceeding in this manner, the binary representative vector can remain accurate. It can easily and reliably be used at a later time in any type of application. The transformation of the deviation value of the acquired biometric data item relative to a representative of the database offers a high level of reliability, particularly due to the fact that an associated statistical noise value is taken into account. Such a statistical noise value can advantageously be used to assign relevant weights to certain representatives in the database which could incorrectly be considered to be close to the captured or acquired biometric data.

For this purpose, it may be advantageous to save the frequency at which each representative is considered to be close to a captured biometric data item. A histogram of the distribution of the distances relative to each representative is thus established, and each of these representatives can be weighted based on it. Then a statistical noise value relative to each representative can be determined based on this histogram.

A second aspect of the invention proposes a method for constructing a database of biometric data. It comprises the following steps:

/1/ capturing a number M' of different biometric data items;

/2/ obtaining M" respective representatives of said biometric data items by transforming the M' biometric data items according to the set of characteristics;

/3/ selecting, from among the M" representatives, the ones which have a deviation value between them that exceeds a threshold value according to a comparison; and /4/ storing the selected representatives in the database.

This method is adapted for coding a biometric data item as a vector of N components according to the vector representation method of an embodiment. It should be noted that the more diversified and complete this biometric dataspace, the more the biometric data representation method according to an embodiment of the invention allows a high level of accuracy.

However, the number of components of the representative vector for a biometric data item corresponds to the number of representatives taken into consideration to illustrate the biometric dataspace. On the one hand a large number of representatives allows having a representative reference space, but on the other hand a large number of representatives implies a large number of comparisons to be made with the biometric data item to be represented, as well as a representative vector of significant length. A compromise should therefore be determined between the reference space concerned and a level of performance for the computation performed both during the method but also when the representative vector is used later on. The number N can advantageously be defined according to this compromise.

The comparisons can be made using a comparison algorithm which may be different from the one used to obtain a representative vector for a biometric data item according to an embodiment of the invention.

When M' captured or acquired biometric data items are available, M" representatives of these biometric data are obtained by transforming the biometric data according to a set of characteristics. This transformation allows simplifying the comparison steps for two biometric data items, only taking into consideration the set of characteristics for each biometric data item and not the biometric data item as a whole. No limitation is placed, however, on the set of characteristics to be taken into consideration here. Such a transformation may correspond to taking into account only a part of the biometric data item, or taking the biometric data item into account in a degraded manner without considering all the details, etc.

Then, once one has the M" representatives, they are compared to each other in pairs using a comparison algorithm. At this point, this involves selecting the most relevant M" representatives to represent the reference space. To do this, it can be decided that only the representatives separated by a deviation value greater than a threshold value are selected. Such a selection eliminates certain representatives which are similar, or are at least very close, but which ultimately do not bring true diversity to the reference space. The number N of selected representatives is directly linked to this threshold value.

Next, only the selected representatives are stored in the storage database to create the reference space in which this vector representative method is implemented.

Thus, in one embodiment, the threshold value is determined as a function of the level of performance of the vector representation of a biometric data item.

This threshold value allows reaching a compromise between a reference space complete enough to be sufficiently representative during subsequent use of the representative vectors, and a representation of the biometric data in vectors that are relatively short in size.

A third aspect of the invention proposes a device for coding biometric data, comprising means for implementing the representative method according to an embodiment of the invention.

A fourth aspect of the invention proposes a system for coding biometric data, comprising a coding device according to the third aspect of the invention and a database storing a number N of representatives of biometric data items, a representative of a biometric data item corresponding to a set of characteristics for said biometric data item.

A fifth aspect of the invention proposes a system for constructing a biometric database suitable for applying a method according to the second aspect of the invention.

A sixth aspect of the invention proposes a computer program comprising instructions for implementing the method according to the first aspect of the invention, when this program is executed by a processor.

Other features, goals, and advantages of the invention will be apparent from reading the following description of one of its embodiments.

BRIEF DESCRIPTION OF THE DRAWINGS

The invention will also be better understood by referring to the drawings, in which.

DETAILED DESCRIPTION OF THE DRAWINGS

In an embodiment of the invention, a database stores a number N of biometric data representatives. A representative for a biometric data item corresponds to a set of characteristics for the biometric data item. In this context, the desire is to encode or represent a biometric data item as a representative vector that is relevant and easy to use at a later time.

Figure 1:
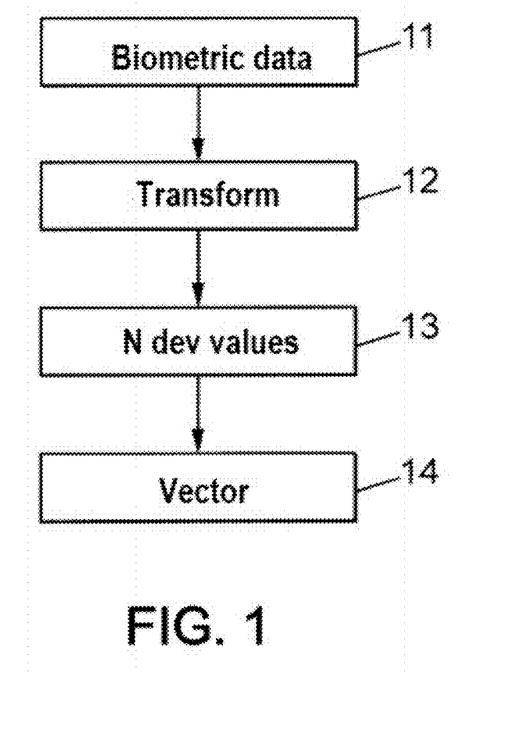
FIG. 1 illustrates the main steps of a method according to an embodiment of the invention.

FIG. 1 illustrates the main steps of an embodiment of the invention. In step 11, a biometric data item is obtained. The biometric data item may be captured, or may have been previously acquired and is received by any means. Then in step 12 (transform), a transformed biometric data item is obtained by transforming this acquired biometric data item according to the set of characteristics used to obtain the representatives stored in the database. Thus, no matter what set of characteristics is taken into account for manipulating the biometric data in the invention, the representatives stored in the database and the biometric data to be represented in vector form are of the same type in that they are expressed using the same set of characteristics.

In step 13 (N dev values), N deviation values are obtained by applying a comparison between the transformed biometric data item and the N representatives in the database.

With the availability of the N representatives stored in the database and the biometric data item transformed according to the same set of characteristics, it is then possible to compare this transformed biometric data item to each of these N representatives in the database. At the end of each of these comparisons, information about the difference between the representative concerned and the transformed biometric data is obtained. This information is referred to as the "deviation value" or "score".

This type of comparison can be done by applying a comparison algorithm of any type.

The end of this step 13 yields N deviation values which allow positioning the biometric data item relative to the biometric dataspace illustrated by the representatives stored in the database.

Then in a step 14, a representative vector for the acquired biometric data is obtained, its respective N components being relative to said N deviation values.

In general, each of the components of the representative vector for the biometric data item concerned is determined from respective scores obtained for each of the representatives in the database.

One can directly use the scores provided by the comparison algorithm and thus obtain the representative vector in a very simple manner. However, no limitation is placed on the mechanism applied in the context of this invention for determining the components of the representative vector from the scores obtained. For example, supplemental information may be associated with the respective scores. In the situation illustrated in the example in FIG. 2, the orientation of the main minutia for the local descriptor closest to the representative concerned could be associated with the score or binary value, for example.

No matter what mechanism is applied here, ultimately a representative vector of fixed length with N components is obtained.

For illustrative purposes, the biometric data considered in the following description correspond to fingerprints.

Figure 2:
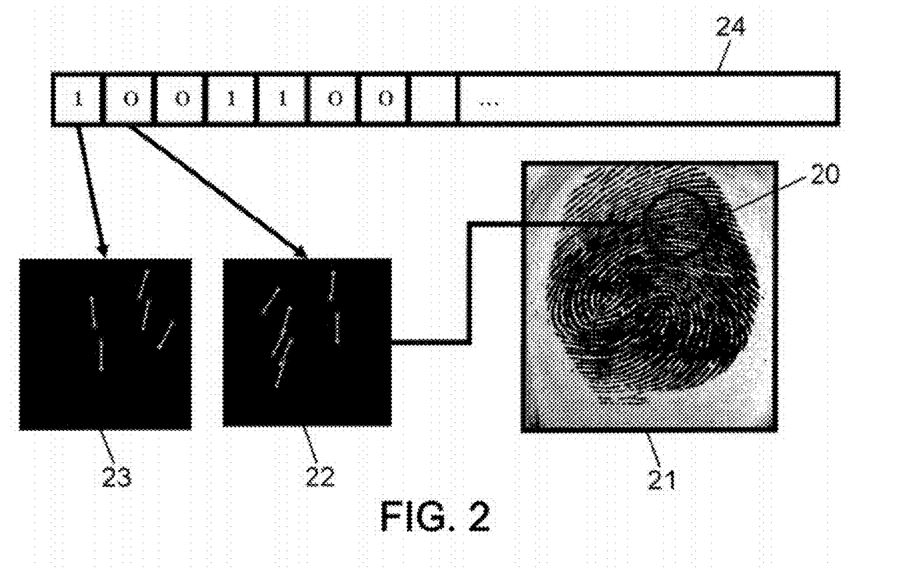
FIG. 2 illustrates an embodiment in which the set of characteristics used corresponds to a local definition of biometric data.

FIG. 2 illustrates an embodiment in which the set of characteristics used corresponds to a local biometric data definition. The local definition may be obtained by determining at least one main minutia in the fingerprint concerned, and determining local information relative to characteristics in the vicinity of this main minutia. In one embodiment, several main minutiae are determined and therefore several local descriptors. The number of local descriptors determined relative to the representatives is not necessarily the same as the number of local descriptors determined relative to the acquired biometric data item to be represented.

In the example illustrated in FIG. 2, the local information corresponds to positions and orientations relative to minutiae in the vicinity of the main minutia concerned. More specifically, FIG. 2 illustrates a biometric data item (fingerprint) 21. For this biometric data item, a local region 20 is determined around a minutia which is considered to be the main minutia. Images 22 and 23 correspond to biometric data transformed according to a local definition expressed as a set of characteristics.

Thus in the database according to an embodiment of the invention, there are N representatives of type 22 and 23. After a comparison of a biometric data item to be represented in vector form with each of these stored representatives, the representative vector 24 is obtained. For example, here, the biometric data item to be represented is considered to be close to the representative 23 and therefore the component of the representative vector corresponding to this representative has the value 1. Next the biometric data item to be represented is considered not to be close to the representative 22. As a result, the component of the representative vector corresponding to this representative has the value 0. By proceeding in this manner for all representatives in the database, N binary components of the vector representing the acquired biometric data are obtained.

Note that this example is in no way limiting. The representative vector could easily not be binary. In addition, other characteristics of the fingerprints could be taken into consideration in the set of characteristics.

The local information may indicate ridge counts, or may indicate the types of minutiae, or the local curvature values for minutiae, or in general any local descriptor based on an image of the biometric data item concerned or based on an analysis of the content of the image of this biometric data item.

In order to simplify the calculations used, one can also position the fingerprint in an absolute reference system which serves as the reference system for the local information used.

Figure 3:
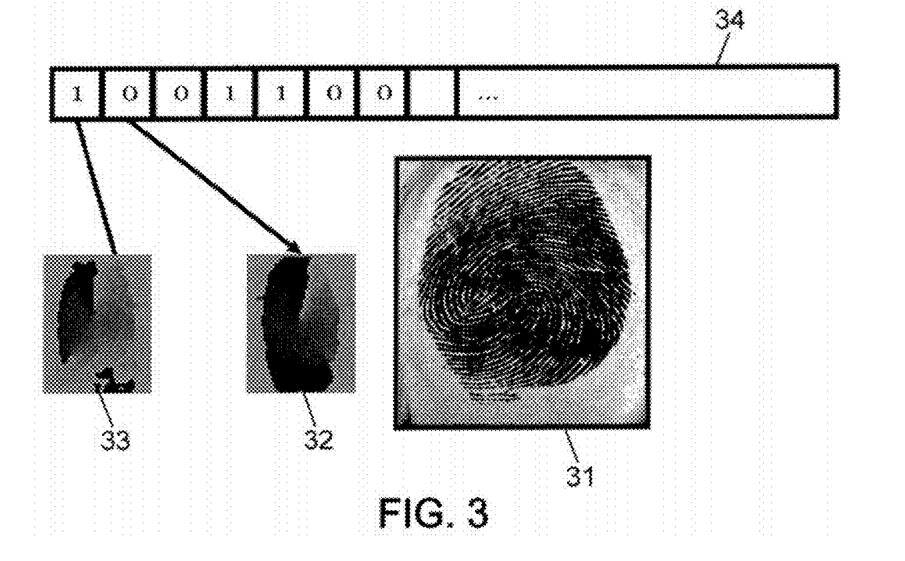
FIG. 3 illustrates an embodiment in which the set of characteristics used corresponds to direction matrices relative to the minutiae of the fingerprints concerned.

FIG. 3 illustrates an embodiment in which the set of characteristics used corresponds to direction matrices relative to the minutiae of the fingerprints concerned. In this case, the entire fingerprint can be taken into consideration. The set of characteristics used here therefore corresponds to an image indicating the directions of the minutiae in the fingerprint as a whole. In this case, the representatives are stored in the database as images, for example the RFM images illustrated in FIG. 3 as images 32 and 33.

In this case, the fingerprint to be represented is transformed for representation as an image of this type. Then this image of the fingerprint to be represented can be superimposed on the image 33 corresponding to the representative associated with the first component of the representative vector, for example using an image correlation algorithm to quantify the comparison.

Here, the images are considered to be close and therefore the component has the value of 1. The same comparison is made between the image of the fingerprint to be represented and the second representative 32, i.e. the one which corresponds to the second component of the representative vector. These two fingerprints are not considered to be close, and therefore the second component has the value of 0. One continues in this manner for a number N of representatives in the database. Ultimately the representative vector 34 for the fingerprint to be represented is obtained.

Figure 4:
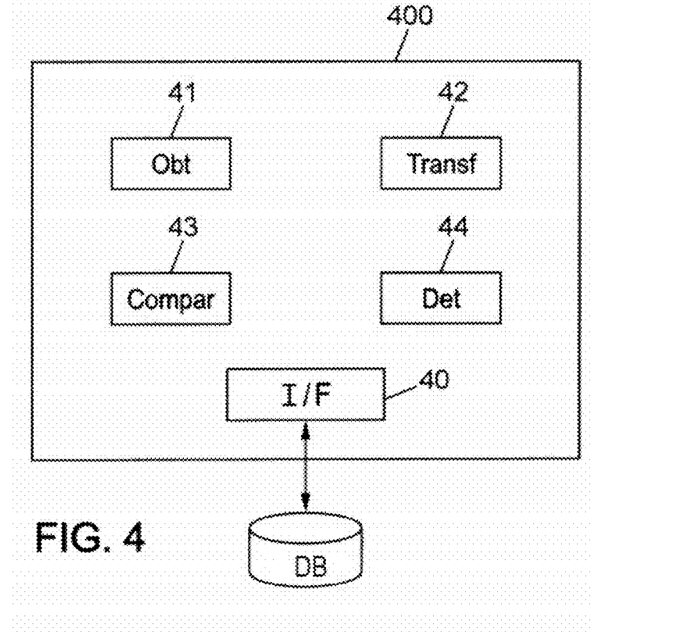
FIG. 4 illustrates a coding device according to an embodiment of the invention.

FIG. 4 illustrates a device for coding biometric data, comprising means for implementing a representation method according to an embodiment of the invention.

The coding device 400 illustrated comprises:
an interface unit (I/F) 40 for cooperating with a database BDD which stores a number N of representatives of biometric data items, a representative of a biometric data item corresponding to a set of characteristics of said biometric data item;
an obtaining unit (Obt) 41 for obtaining an acquired biometric data item;
a transformation unit (Transf) 42 for obtaining a transformed biometric data item by transforming said acquired biometric data item according to said set of characteristics;
a comparison unit (Compar) 43 for obtaining N deviation values by applying a comparison between the transformed biometric data item and the N representatives in the database; and
a determination unit (Det) 44 for determining a representative vector for the acquired biometric data item, said representative vector having a number of components that is less than or equal to N, said components being determined relative to said N deviation values.

Figure 5:
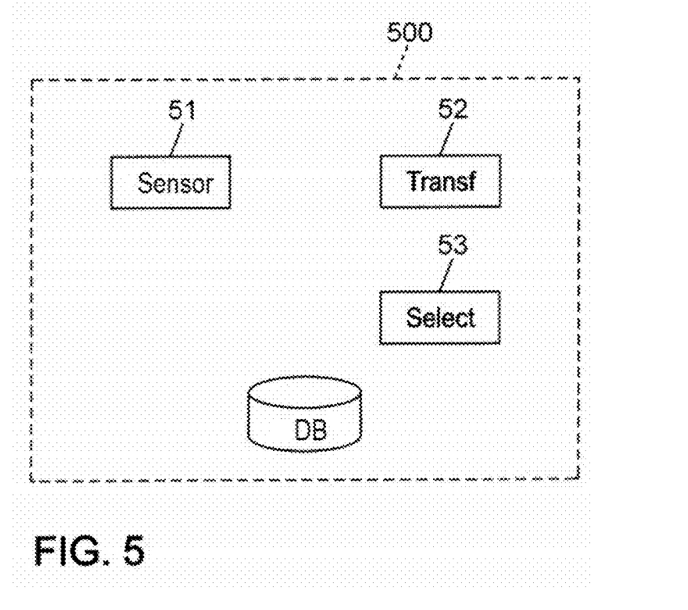
FIG. 5 illustrates a system for constructing a database according to an embodiment of the invention.

FIG. 5 illustrates a system 500 for constructing a biometric database according to an embodiment of the invention. Such a construction system comprises:
- a sensor 51 for capturing a number M' of different biometric data items;
- a transformation unit (Transf) 52 for obtaining M'' respective representatives of said biometric data items by transforming the M' biometric data items according to the set of characteristics;
- a selection unit (Select) 53 for selecting, from among the M'' representatives, the ones which have a deviation value between them that exceeds a threshold value according to a comparison; and
- a database BDD for storing the selected representatives in the database.

The invention claimed is:

1. A method for encoding a biometric data item, comprising:
 defining a biometric dataspace comprising a plurality of representatives of biometric data items stored in a database, wherein each representative is defined in accordance with a set of characteristics of a biometric data item;
 obtaining an acquired biometric data item;
 transforming said acquired biometric data item according to said set of characteristics to generate a transformed biometric data item;
 positioning the acquired biometric data item relative to the biometric dataspace by applying a comparison between the transformed biometric data item and each representative in the database to obtain N deviation values which position the acquired biometric data item relative to the biometric dataspace; and
 generating an encoded form of the acquired biometric data item as a representative vector for the acquired biometric data item, said representative vector having at most N components, wherein each one of said N components is determined as a function of a corresponding one of said N deviation values;
 wherein the representative vector for the biometric data item is a binary vector, and wherein each of the components is a binary value resulting from comparison against at least one threshold value; and
 wherein the binary vector is obtained by the following steps:
  determining a statistical noise value relative to each representative;
  obtaining a weight associated with each representative as a function of the statistical value relative to it;
  determining the binary components of the representative vector by comparing the deviation values obtained for the respective representatives to the threshold value, taking into consideration the associated weight obtained using a histogram of the distribution of the distances relative to each representative.

2. The method according to claim 1, further comprising:
 /i/ selecting as the N deviation values, values that are relevant according to a criterion; and
 /ii/ determining the N components relative to the selected deviation values.

3. The method according to claim 1, wherein a set of characteristics corresponds to a local definition of biometric data.

4. The method according to claim 3, wherein the local definition is obtained by:
 determining a main minutia; and
 determining local information relating to characteristics neighboring the main minutia.

5. The method according to claim 4, wherein the local information indicates at least one element selected from the group consisting of: a position of a neighboring minutia, a ridge count, a minutia type, and a local curvature.

6. The method according to claim 1, wherein a set of characteristics corresponds to an image illustrating the biometric data item.

7. The method, according to claim 1, wherein the representative biometric data items in the database are obtained by the following steps:
 /1/ capturing a number M' of different biometric data items;
 /2/ obtaining M'' respective representatives of said biometric data items by transforming the M' biometric data items according to the same set of characteristics;
 /3/ selecting, from among the M'' representatives, the ones which have a deviation value between them that exceeds a threshold value according to a comparison; and
 /4/ storing the selected representatives in the database.

8. The method according to claim 7, wherein the threshold value is determined as a function of the level of performance of the vector representation of a biometric data item.

9. Apparatus for encoding biometric data in a vector representation, comprising:
 an interface unit for cooperating with a database which stores a plurality of representatives of biometric data items as a biometric dataspace, wherein each representative is defined in accordance with a set of characteristics of a biometric data item;
 an obtaining unit for obtaining an acquired biometric data item;
 a transformation unit for transforming said acquired biometric data item according to said set of characteristics to generate a transformed biometric data item;
 a comparison unit for positioning the acquired biometric data item relative to the biometric dataspace by applying a comparison between the transformed biometric data item and each representative in the database to generate N deviation values which position the acquired biometric data item relative to the biometric dataspace; and
 a determination unit for generating an encoded form of the acquired biometric data item as a representative vector for the acquired biometric data item, said representative vector having at most N components, wherein each one of said N components is determined as a function of a corresponding one of said N deviation values;
 wherein the representative vector for the biometric data item is a binary vector, and wherein each of the components is a binary value resulting from comparison against at least one threshold value; and
 wherein the determination unit obtains the binary vector by performing the following steps:
  determining a statistical noise value relative to each representative;
  obtaining a weight associated with each representative as a function of the statistical value relative to it;
  determining the binary components of the representative vector by comparing the deviation values obtained for the respective representatives to the threshold value, taking into consideration the associated weight obtained using a histogram of the distribution of the distances relative to each representative.

10. The apparatus according to claim 9, further comprising a database storing the representative biometric data items.

11. The apparatus according to claim 10, additionally comprising:
- a sensor for capturing a number M' of different biometric data items;
- a transformation unit for obtaining M" respective representatives of said biometric data items by transforming the M' biometric data according to the same set of characteristics;
- a selection unit for selecting, from among the M" representatives, the ones which have a deviation value between them that exceeds a threshold value according to a comparison; and
- a database for storing the selected representatives in the database.

12. A non-transitory computer storage medium having stored thereon computer program instructions that, when executed by a processor, perform the method according to claim 1.

13. The apparatus according to claim 9, wherein the determining unit is configured to:
- /i/ select as the N deviation values, values that are relevant according to a criterion; and
- /ii/ determine the N components relative to the selected deviation values.

14. The apparatus according to claim 13, wherein a set of characteristics corresponds to a local definition of biometric data.

15. The apparatus according to claim 14, wherein the local definition is obtained by:
- determining a main minutia; and
- determining local information relating to characteristics neighboring the main minutia.

16. The apparatus according to claim 15, wherein the local information indicates at least one element selected from the group consisting of: a position of a neighboring minutia, a ridge count, a minutia type, and a local curvature.

17. The apparatus according to claim 9, wherein a set of characteristics corresponds to an image illustrating the biometric data item.

18. The apparatus according to claim 9, further comprising means for obtaining the representative biometric data items in the database, said means for obtaining configured to perform the following operations:
(1) capturing a number M' of different biometric data items;
(2) obtaining M" respective representatives of said biometric data items by transforming the M' biometric data items according to the same set of characteristics;
(3) selecting, from among the M" representatives, the ones which have a deviation value between them that exceeds a threshold value according to a comparison; and
(4) storing the selected representatives in the database.

* * * * *